(12) United States Patent
Kent

(10) Patent No.: US 11,112,290 B2
(45) Date of Patent: Sep. 7, 2021

(54) MEASURING CUPS AND SPOONS WITH LEVELER

(71) Applicant: Progressive International Corporation, Kent, WA (US)

(72) Inventor: Joseph Kent, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 17/071,130

(22) Filed: Oct. 15, 2020

(65) Prior Publication Data

US 2021/0123782 A1 Apr. 29, 2021

Related U.S. Application Data

(60) Provisional application No. 62/925,453, filed on Oct. 24, 2019.

(51) Int. Cl.
*G01F 19/00* (2006.01)

(52) U.S. Cl.
CPC .................. *G01F 19/002* (2013.01)

(58) Field of Classification Search
CPC ............................ G01F 19/002; G01F 19/00
USPC .......................................................... 73/426
See application file for complete search history.

(56) References Cited

U.S. PATENT DOCUMENTS

| | | | | |
|---|---|---|---|---|
| 1,249,017 A | * | 12/1917 | Brunkhurst | G01F 19/002 73/426 |
| 2,042,945 A | * | 6/1936 | Lemay | G01F 19/002 73/426 |
| 2,259,504 A | * | 10/1941 | Wilson | G01F 19/002 73/426 |
| 2,459,466 A | * | 1/1949 | Spreen | G01F 19/002 73/426 |
| 6,470,745 B1 | * | 10/2002 | Reay | G01F 19/002 116/284 |
| D494,876 S | * | 8/2004 | Tollman | D10/46.2 |
| 6,974,056 B2 | * | 12/2005 | Rea | G01F 19/002 222/460 |
| D589,379 S | * | 3/2009 | Zerlin | D10/46.2 |

FOREIGN PATENT DOCUMENTS

| | | | | |
|---|---|---|---|---|
| JP | 2006234408 A | * | 9/2006 | |
| JP | 2009183391 A | * | 8/2009 | |
| JP | 2009189464 A | * | 8/2009 | |
| JP | 2015078971 A | * | 4/2015 | |
| JP | 2018204961 A | * | 12/2018 | |
| JP | 2019032244 A | * | 2/2019 | |
| JP | 2019078536 A | * | 5/2019 | |

* cited by examiner

*Primary Examiner* — Jamel E Williams
(74) *Attorney, Agent, or Firm* — Lowe Graham Jones PLLC

(57) ABSTRACT

A measuring cup or spoon includes a handle having a distal end and a proximal end, with a bowl positioned at the distal end of the handle, the bowl forming an interior space and terminating in an upper rim, the upper rim defining a plane and having a first side and a diametrically opposite second side. A wiper is attached to the handle by an arm, and is biased toward a first position at the first side of the upper rim, the wiper being selectively movable upon application of a force by a user to a second position at the second side of the rim, such that when the wiper is moved from the first position to the second position the wiper scrapes over the upper rim.

17 Claims, 7 Drawing Sheets

US 11,112,290 B2

MEASURING CUPS AND SPOONS WITH LEVELER

BACKGROUND OF THE INVENTION

In cooking or other food preparation, measuring spoons and measuring cups are an essential tool. Often, however, when the measuring spoon or cup is used to scoop an ingredient, the ingredient ends up being heaped above the bowl forming the spoon or cup. The excess ingredient must be leveled off in some fashion, such as by scraping it with a knife or against a portion of the ingredient container. This is often a two-handed process, which requires an additional tool beyond the cup or spoon itself. In some cases, a user will simply skip the leveling process because of the awkwardness or inconvenience, resulting in imperfectly baked goods or other foods.

SUMMARY OF THE INVENTION

A measuring cup or spoon in accordance with a preferred embodiment comprises a handle having a distal end and a proximal end, with a bowl positioned at the distal end of the handle, the bowl forming an interior space and terminating in an upper rim, the upper rim defining a plane and having a first side and a diametrically opposite second side.

A wiper is attached to the handle and biased toward a first position at the first side of the upper rim, the wiper being selectively movable upon application of a force by a user to a second position at the second side of the rim, such that when the wiper is moved from the first position to the second position the wiper scrapes over the upper rim.

The measuring cup may further include a guide positioned on the handle, the wiper being configured to engage the guide to define a path of travel from the first position to the second position.

In some versions, the guide is configured as a channel formed in the handle, and the wiper is connected to a pin which extends into the channel, the pin being moveable along a path within the channel from a first side of the channel to a second side of the channel.

The pin is preferably removably positioned within the channel.

The handle further preferably includes an arm extending from the proximal end of the handle, the wiper being mounted on the arm.

The arm, in some versions, is pivotally attached to the handle.

The arm may be attached to the handle via a living hinge, and may be integrally formed with the handle.

The guide most preferably is configured as a channel formed in the handle, the arm having a pin which extends into the channel, the pin being moveable along a path within the channel from a first side of the channel to a second side of the channel.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
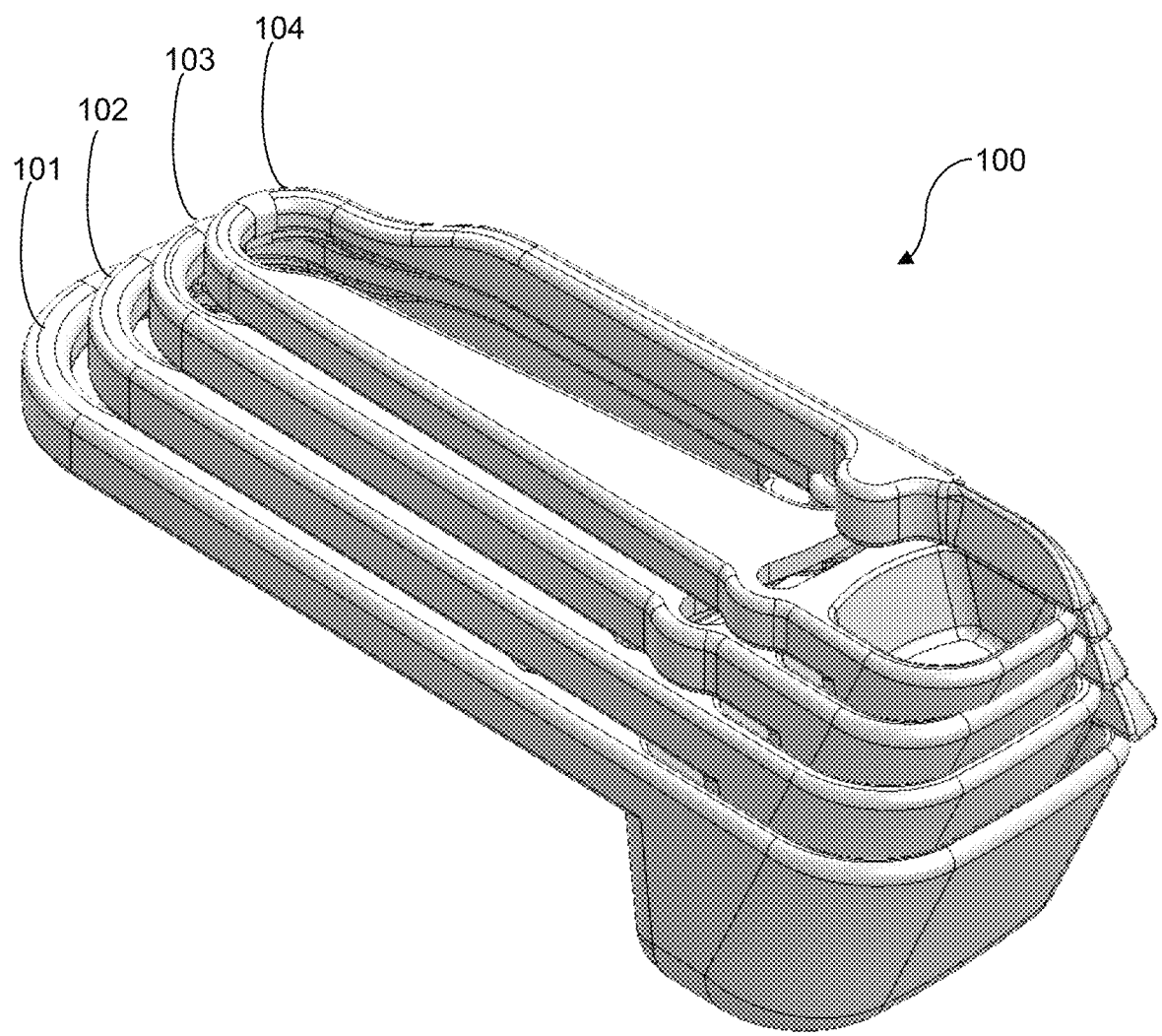
FIG. 1 is a top front isometric view of a preferred set of measuring spoons with levelers.

A preferred set 100 of measuring spoons with levelers is shown in isometric view in FIG. 1. In this case, four such spoons are shown, forming a set. More specifically, a large spoon 101 is illustrated at the bottom of a nested stack of spoons which forms the set, with additional spoons 102, 103, 104 each seated inside one another with the largest spoon 101 at the bottom. The smallest spoon 104 is positioned at the top of the set. In other versions, more than four measuring spoons may be provided in a single set, or fewer than four may be provided.

Figure 2:
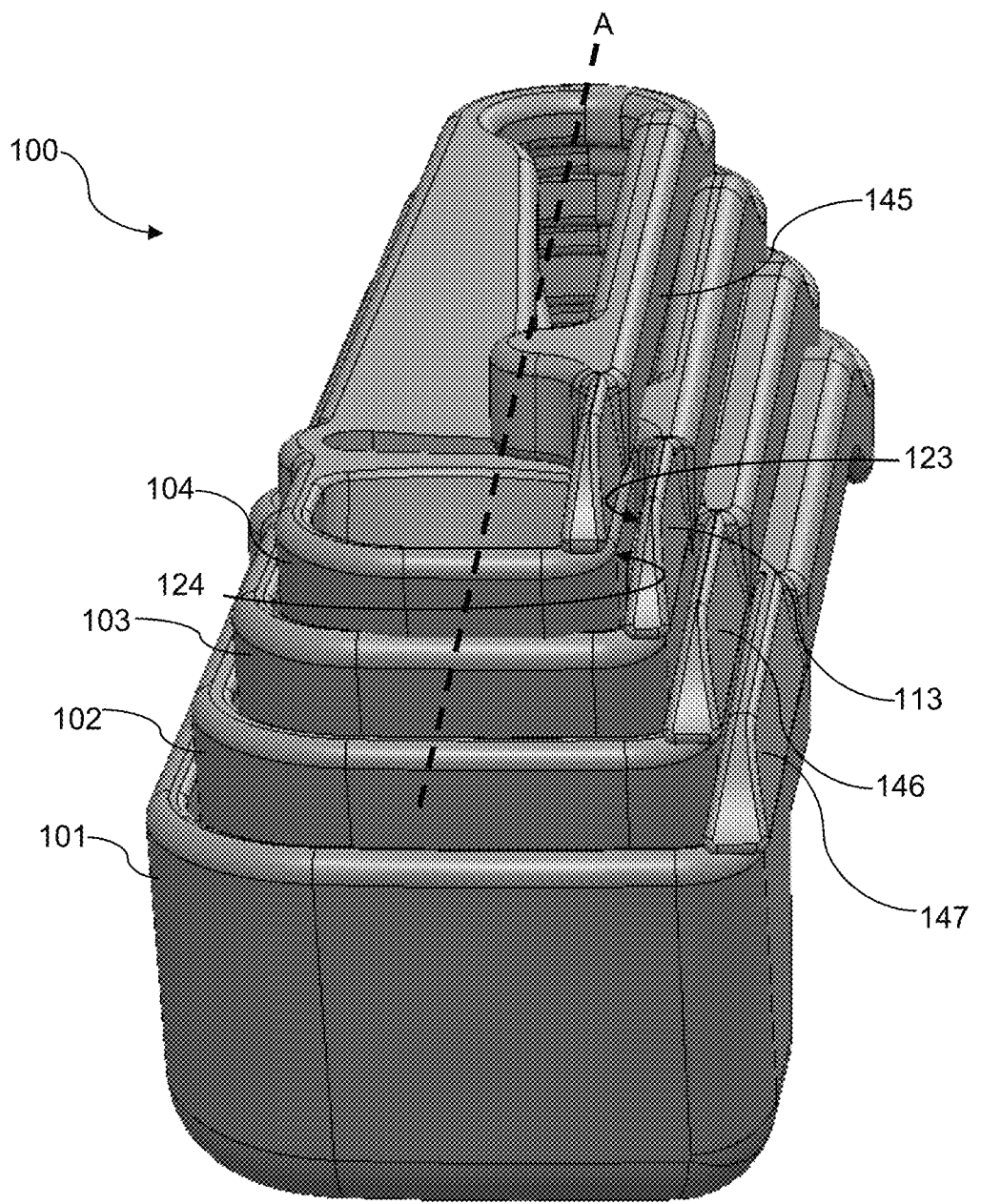
FIG. 2 is a front view of the set of measuring spoons.

FIG. 2 illustrates a front isometric view of the preferred set 100 of measuring spoons of FIG. 1, shown in the same nested orientation. In this view, each of the levelers (e.g., 113, 145, 146, 147) are shown as being positioned in a stepped configuration, with the leveler of each successive smaller spoon being above and toward the interior of the leveler of a larger spoon beneath it. Most preferably, an interior surface (e.g., 123) of a leveler on a lower spoon (e.g., 103) is positioned closely adjacent to or abutting an outer surface (e.g., 124) of the bowl of an upper (and therefore smaller) spoon (e.g., 104). Likewise, the leveler of each upper spoon is positioned inward (that is, relatively closer to a central axis A extending through the handle and bowl) of the leveler of the larger spoon beneath it. In this way, each of the levelers of each of the spoons when in the retracted position as illustrated is positioned out of the way of the nested spoon above it, and out of the way of the nested spoon beneath it.

Figure 3:
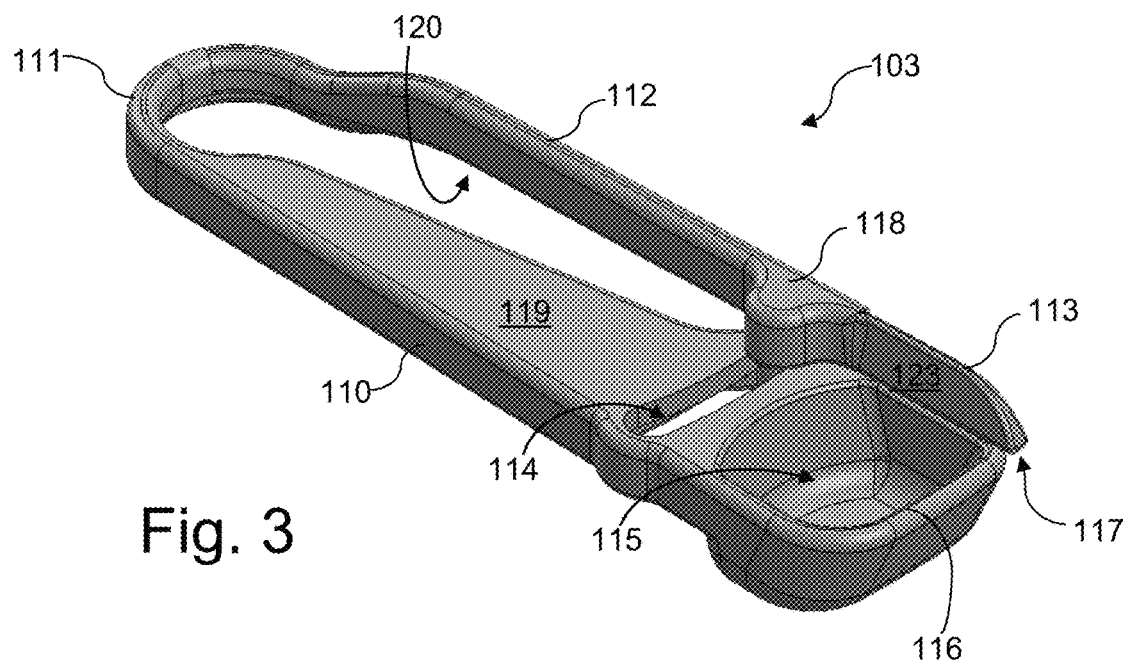
FIG. 3 is a top front isometric view of a single preferred measuring spoon.

The details of each of the preferred spoons are shown in greater detail with reference to the perspective view of a representative spoon in FIG. 3. In this case, the representative spoon is one of the intermediate spoons 103 as illustrated in FIGS. 1 and 2. As shown, the preferred spoon 103 includes a handle 110 having a bowl 115 at a distal end of the handle in which the bowl forms an interior space defining a known volume. Each of the other spoons in the set is preferably configured in the same fashion, but having a bowl defining a different known volume. The bowl 115 terminates in an upper rim 116 in which the upper rim lies in a common plane. The handle includes a proximal end 111 opposite the distal end, and further defines an upper surface 119 which in the preferred embodiment lies in the same plane as the upper rim of the bowl.

A leveling arm 112 is attached to the handle, preferably at the proximal end of the handle, and extends toward the distal end of the handle. The leveling arm 112 terminates in a leveling wiper 113 which has a lower surface 117 configured to scrape across the upper rim 116 of the bowl. Thus, the leveling arm, and wiper, are moveable between a first or retracted position which is stowed and preferably out of the way of the bowl on a first side of the bowl, and second or extended position on the opposite second side of the bowl. In the preferred version, the leveling arm includes a lower surface 120 which scrapes across the upper surface 119 of the handle during the course of the pivotal movement of the leveling arm.

In the preferred example of the invention, the leveling arm 112 is integrally formed with the handle and flexibly attached to the proximal end of the handle. In this manner, the leveling arm is connected to the proximal end of the handle for pivotal movement of the leveling arm with respect to the proximal end of the handle. In other versions, the leveling arm may be formed separately and thereafter be pivotally attached to the handle. In the illustrated version, the leveling arm extends from the proximal end of the handle and is pivotally moveable as a result of the natural resilience created by the thickness of the material used to form the device. In one example, the entire spoon is integrally formed from a plastic material in which the proximal end transitions to the leveling arm at a transition region T (see FIG. 4) by forming the transition region and optionally the leveling arm with a relatively narrow configuration, in which the height H (see FIG. 5) is greater than the width W (see FIG. 4). In the illustrated example, the transition region forms a U-shape, in which the handle 110 extends away from one upright of the U shape and the leveling arm 112 extends away from the other upright of the U shape.

Figure 8:
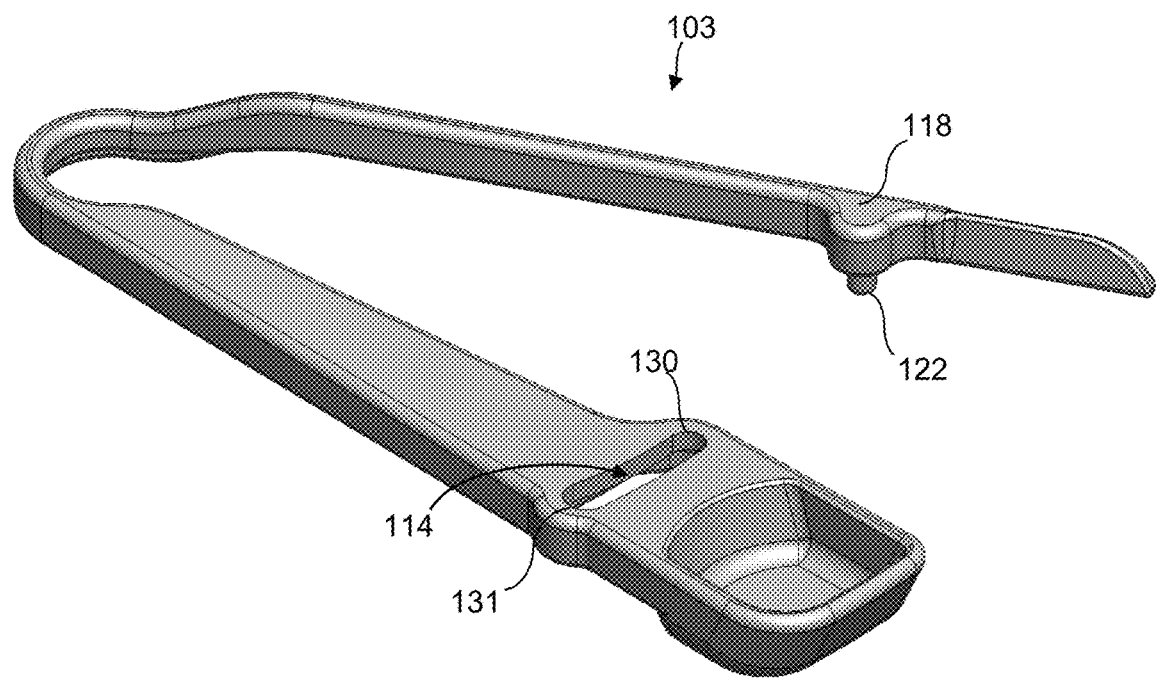
FIG. 8 is a top front isometric view of a single preferred measuring spoon, shown with a leveler disengaged.
Figure 9:
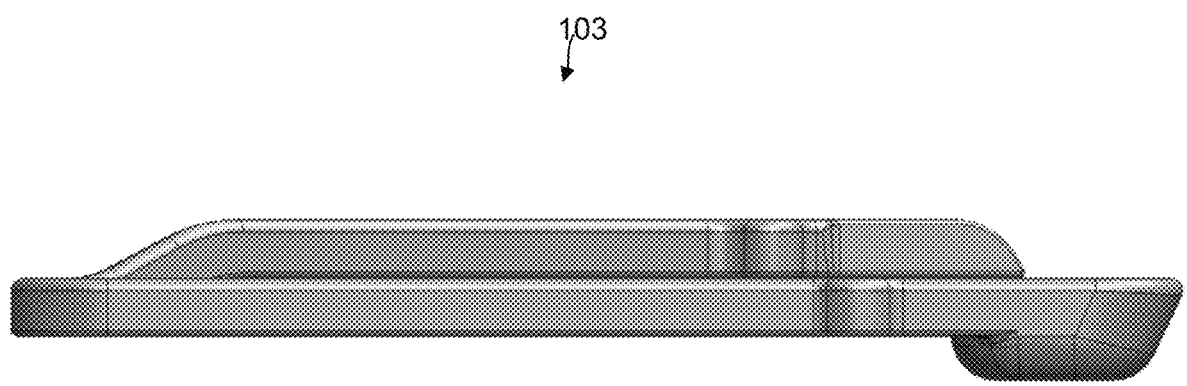
FIG. 9 is a front elevational view of the spoon of FIG. 8.

A guide is provided to constrain the interaction of the leveling arm or leveling wiper with respect to the handle. In the preferred example, the guide includes a channel 114 positioned in the handle between the proximal end of the handle and the bowl. Most preferably, the channel is relatively closer to the distal end of the handle, and near the bowl. In the preferred example of the invention, the channel is configured as an opening extending fully through the handle. As best seen in FIG. 8, a pin 122, extends downwardly from the wiper arm. In the illustrated example, the wiper arm includes a knuckle or boss 118 for supporting the pin, in which the boss is positioned at a juncture between the wiper arm and the leveling wiper. The pin 122 is configured with a dimension allowing the pin to be seated within the channel 114 for guided and constrained movement of the pin within the channel. As also seen in FIG. 8, channel 114 defines the range of movement of the pin and therefore the leveling arm such that travel of the pin from a first end 130 of the channel to the second end 131 of the channel corresponds to movement of the leveling arm between the retracted and extended positions.

Figure 4:
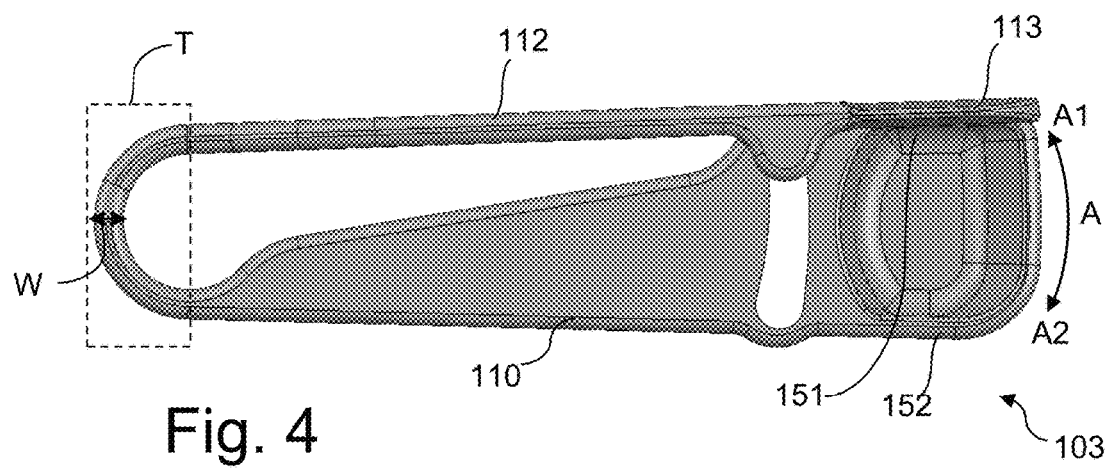
FIG. 4 is a top plan view of a preferred measuring spoon.
Figure 5:
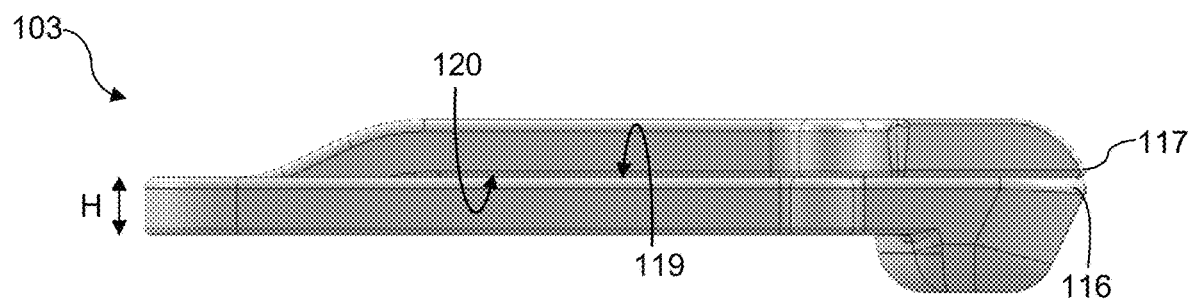
FIG. 5 is a front elevational view of a preferred measuring spoon.

In FIGS. 1 through 6, the preferred examples of the leveling spoons are shown with the pin trapped within the channel and the leveling arm in the first or retracted position. In FIGS. 7 and 8, however, the pin has been removed from the channel and the natural bias of the transition region T has urged the leveling arm away from the handle. Thus, the spoons are preferably configured such that a natural biasing force urges the pin 122 toward the first end 130 of the channel. For example, the spoon 103 may be integrally formed from a plastic material in a mold generally corresponding to the shapes as shown in FIGS. 7 and 8. In the positions as shown in these two figures, the handle and leveling arms are relaxed and not held in position by an external force. Consequently, the leveling arm must be forced toward the handle in order to seat the pin within the channel, and once seated the leveling arm will have a natural urging force away from the handle and toward the first end 130 of the channel. As seen in FIG. 4, for example, the leveling wiper travels along a path defined by arrow A as the pin travels within the channel. The leveling wiper thus moves generally from a first position at A1 at a first side of the rim 151 and to a second position at A2 at a diametrically opposite second side of the rim 152. In addition, during the travel of the wiper across the rim, the wiper will preferably travel over the entirety of the perimeter defined by the rim as well as the plane defined by the upper surface of the rim. The natural urging force will keep the leveling wiper at the first position, A1.

Figure 6:
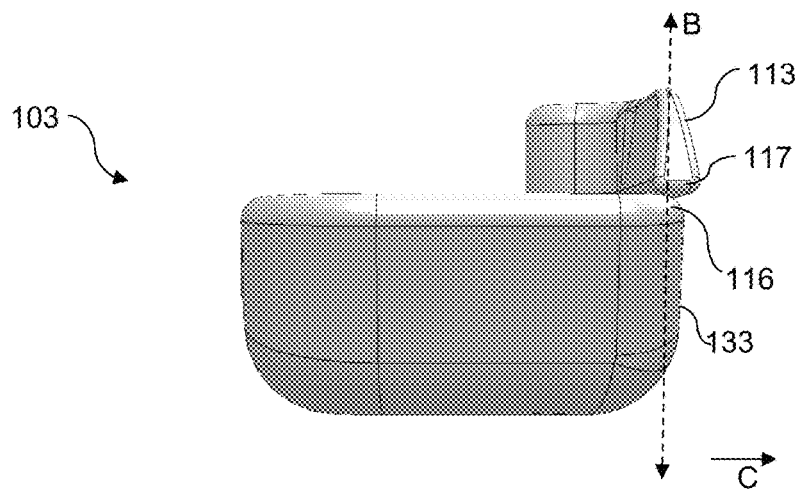
FIG. 6 is a right side elevational view of a preferred measuring spoon.
Figure 7:
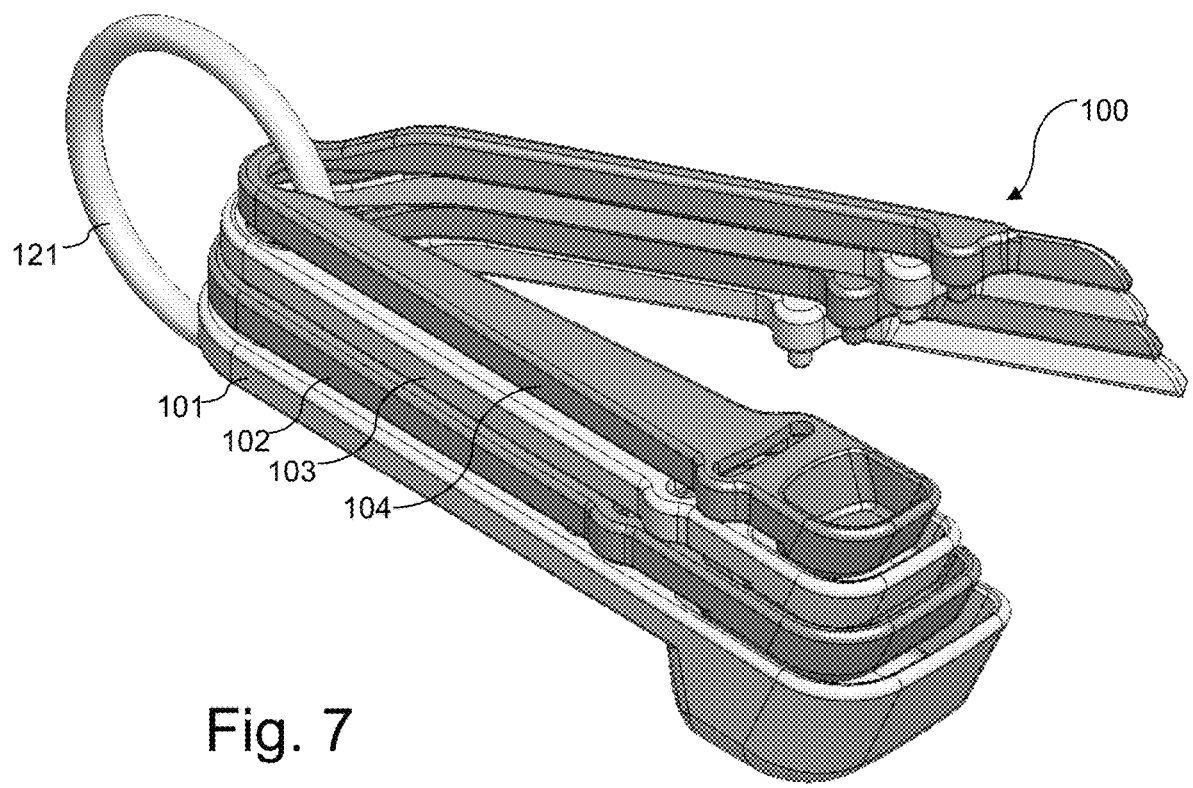
FIG. 7 is a top front isometric view of a set of measuring spoons, shown with levelers disengaged.

With reference to FIG. 6, in the stowed or retracted position the leveling wiper 113 is positioned directly above the sidewall 133 of the bowl, such that the leveling wiper and sidewall lie at least partially in a common plane B. Most preferably, the leveling wiper 113 does not overlie any portion of the interior of the bowl in the stowed position. In some versions, the leveling wiper may lie outwardly beyond the plane B in the stowed position; that is, in the direction of arrow C with respect to the plane B.

In the disconnected configuration in which the pin is removed from the channel such as in FIGS. 7 and 8, a ring 121 can be inserted and positioned at the transition region of one or multiple spoons. Reinsertion of the pin into the channel traps the ring within the transition region, and allows one or more spoons to be attached to a common ring.

Figure 10:
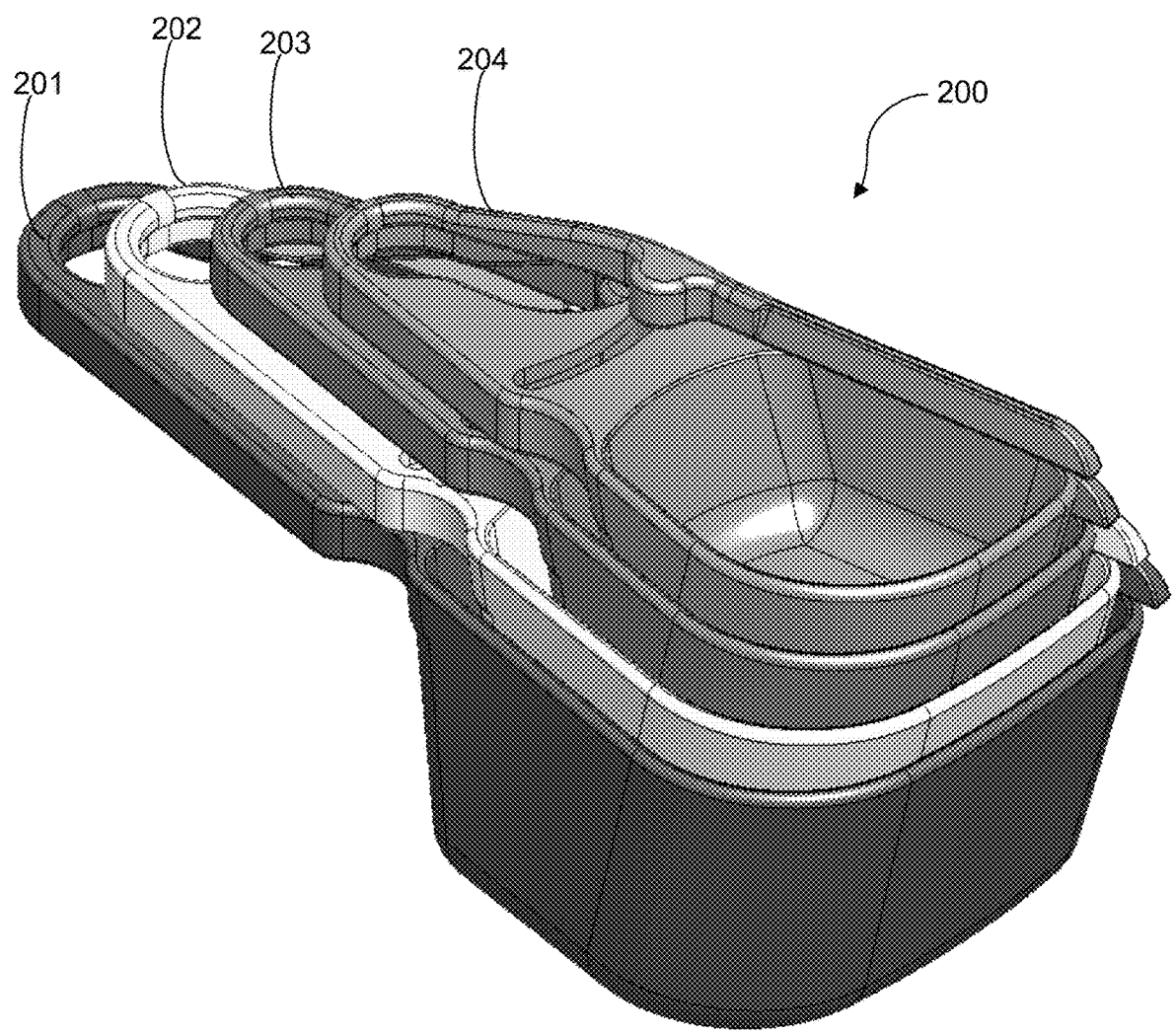
FIG. 10 is a top front isometric view of a preferred set of measuring cups.
Figure 11:
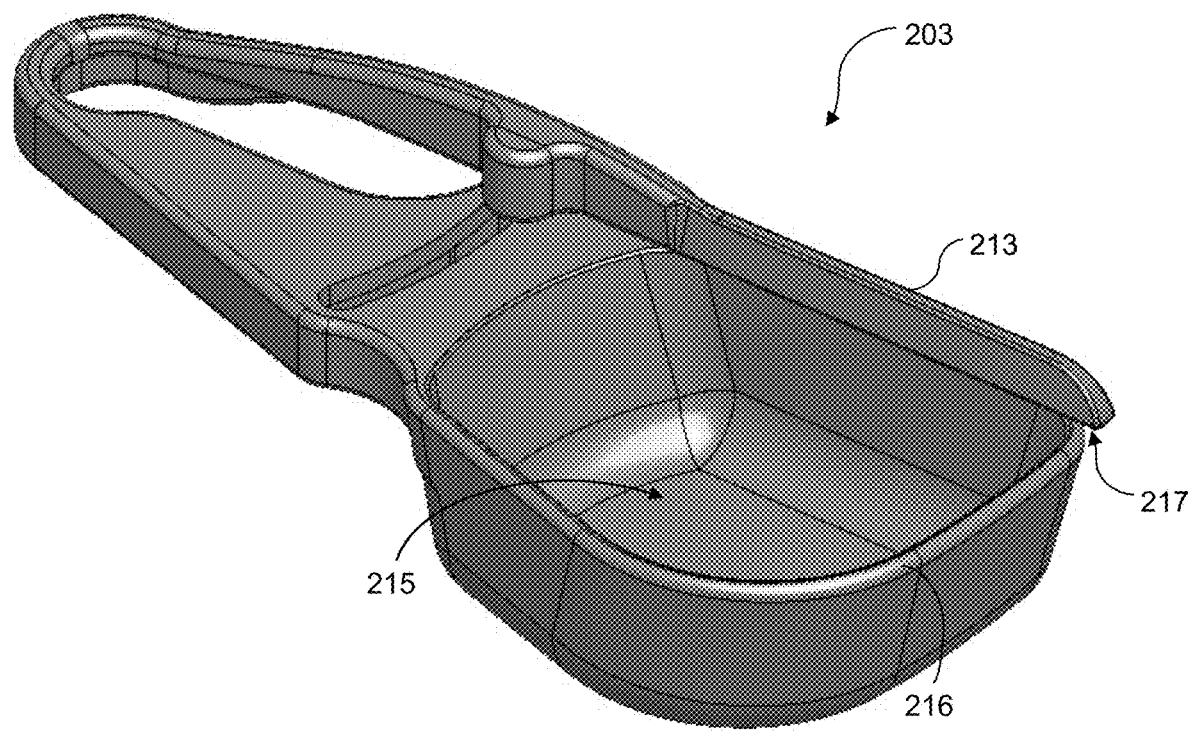
FIG. 11 is a top front isometric view of a single preferred measuring cup.

The above description has been directed to one or a set of measuring spoons, but applies equally to one or a set of measuring cups. FIGS. 10 and 11 illustrate measuring cups having attached levelers, in which the primary difference is the size of the bowl (which is larger for the measuring cups than for the spoons). In FIG. 10, a set 200 of four measuring cups 201, 202, 203, 204 are shown. Each includes a handle having a proximal end and a distal end, with a bowl of known volume positioned at the distal end. A leveling arm having a leveling wiper is mounted to the proximal end of the handle in the fashion described above, including a guide which is preferably in the form of a pin trained within a channel. As seen in FIG. 11, an exemplary measuring cup 203 is configured with a bowl 215 having an upper rim 216 which is configured to be scraped by a leveling wiper 213 having a lower edge 217.

In use, a user will select a measuring spoon or measuring cup having a bowl of a desired volume and dip the bowl into a container of sugar, flower, or other ingredients. Typically, some of the cooking ingredients such as sugar will be mounded above the volume defined by the bowl, and the user can then move the leveling arm and therefore the leveling wiper from the first position to the second position, thereby causing the leveling wiper to scrape across the upper rim of the bowl so that the bowl is precisely filled to the desired volume. Advantageously, the position of the leveling arm allows for one handed use of the leveling arm as a scraper, and in most cases a user may press a thumb against the leveling arm to pull the leveling arm from the first position to the second position. In the illustrated example, the leveling arm is shown being positioned at the left side of the measuring cup or spoon in the stowed position, thereby facilitating a thumb-operable device for a right-handed person. In other versions of the invention, the orientation may be reversed to thereby allow for used by a left-handed person.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

I claim:

1. A measuring cup or spoon, comprising:
   a handle having a distal end and a proximal end;
   a bowl positioned at the distal end of the handle, the bowl forming an interior space and terminating in an upper rim, the upper rim defining a plane and having a first side and a diametrically opposite second side;
   a wiper attached to the handle and being biased toward a first position at the first side of the upper rim, the wiper being selectively movable upon application of a force by a user to a second position at the second side of the rim, wherein when the wiper is moved from the first position to the second position the wiper scrapes over the upper rim; and
   a guide configured as a channel formed in the handle and a pin extending from the arm, the pin being constrained within the channel to define a path of travel from the first position to the second position.

2. The measuring cup or spoon of claim 1, wherein the channel is located near the bowl and relatively closer to the distal end of the handle than to the proximal end of the handle.

3. The measuring cup or spoon of claim 2, wherein the channel is configured as an opening extending fully through the handle.

4. The measuring cup or spoon of claim 3, wherein the pin is removably positioned within the channel.

5. The measuring cup or spoon of claim 2, wherein the handle further comprises an arm extending from the proximal end of the handle, the wiper being mounted on the arm, and further wherein a lower surface of the arm scrapes against an upper surface of the handle while the wiper scrapes over the upper rim when the wiper is moved from the first position to the second position.

6. The measuring cup or spoon of claim 5, wherein the arm is pivotally attached to the handle.

7. The measuring cup or spoon of claim 5, wherein the arm is attached to the handle via a living hinge.

8. The measuring cup or spoon of claim 5 wherein the arm is integrally formed with the handle.

9. The measuring cup or spoon of claim 8, wherein the pin is moveable along a path within the channel from a first side of the channel to a second side of the channel.

10. The measuring cup or spoon of claim 2, further comprising a second measuring cup or spoon configured in accordance with the measuring cup or spoon of claim 2, the measuring cup or spoon being nestable within the second measuring cup or spoon.

11. A measuring cup or spoon, comprising:
    a handle having a distal end and a proximal end;
    a bowl positioned at the distal end of the handle, the bowl forming an interior space and terminating in an upper rim, the upper rim having a first side and a diametrically opposite second side;
    an arm attached to the proximal end of the handle and extending toward the bowl;
    a guide configured as a channel formed in the handle, the guide having a first end and a second end;
    a pin extending from the arm, the pin being constrained within the channel to define a path of travel from the first position to the second position; and
    a wiper attached to the arm and being biased toward a first position at the first side of the upper rim, the wiper being selectively movable upon application of a force by a user to a second position at the second side of the rim, the pin being at the first end of the guide when the wiper is located at the first position and the pin being at the second end of the guide when the wiper is located at the second position, wherein when the wiper is moved from the first position to the second position the wiper scrapes over the entire perimeter of the upper rim.

12. The measuring cup or spoon of claim 11, wherein the channel extends fully through the handle.

13. The measuring cup or spoon of claim 12, wherein the channel is located near the bowl and relatively closer to the distal end of the handle than to the proximal end of the handle.

14. The measuring cup or spoon of claim 13, wherein the pin is removably positioned within the channel.

15. The measuring cup or spoon of claim 11, wherein the arm is pivotally attached to the handle.

16. The measuring cup or spoon of claim 11, wherein the arm is attached to the handle via a living hinge.

17. The measuring cup or spoon of claim 11 wherein the arm is integrally formed with the handle, and further wherein a lower surface of the arm scrapes against an upper surface of the handle while the wiper scrapes over the upper rim when the wiper is moved from the first positon to the second position.

\* \* \* \* \*